Dec. 18, 1923.
T. W. VARLEY
1,478,012
ALTERNATING CURRENT DYNAMO ELECTRIC MACHINE
Filed April 8, 1920
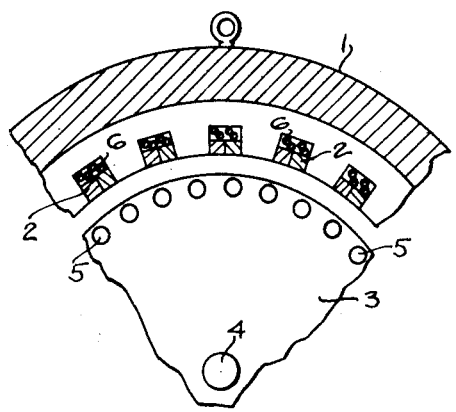
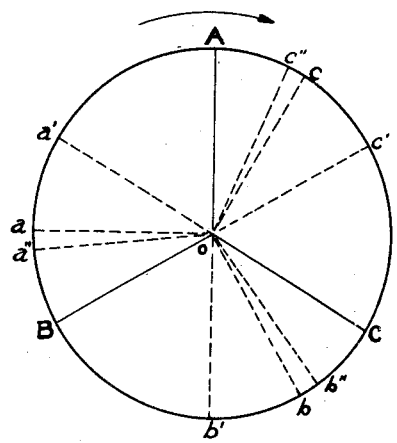
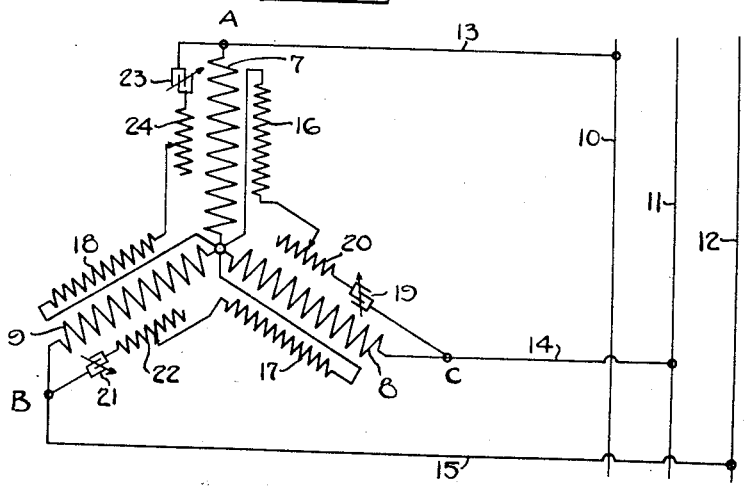
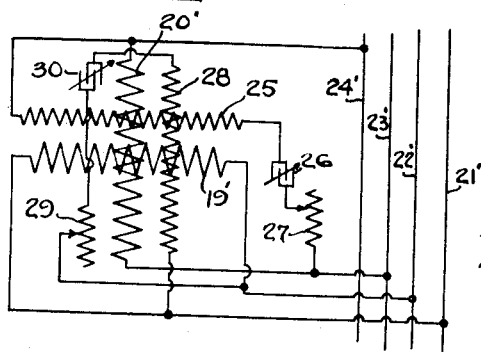
INVENTOR
Thomas W. Varley
BY
Thomas Howe
ATTORNEY Patented Dec. 18, 1923.

1,478,012

UNITED STATES PATENT OFFICE.

THOMAS W. VARLEY, OF NEW YORK, N. Y.

ALTERNATING-CURRENT DYNAMO-ELECTRIC MACHINE.

Application filed April 3, 1920. Serial No. 372,121.

*To all whom it may concern:*

Be it known that I, THOMAS W. VARLEY, a citizen of the United States of America, residing at city, county, and State of New York, have invented new and useful Improvements in Alternating-Current Dynamo-Electric Machines, of which the following is a specification.

This invention relates to alternating current dynamo electric machines.

One of the great objections to the use of alternating current apparatus is that the relationship of the electro-motive force and the current is so changed as to be very undesirable. Thus in the case of the induction motor, the inductance of the apparatus is such that the current is caused to lag behind the electro-motive force by a considerable angle so that the power factor is low, which, as is known by everyone skilled in the art, is a most undesirable condition. The magnetizing current of the motor is supplied by means of current in the main winding, is substantially in quadrature with the electro-motive force impressed upon the motor and is substantially wattless. Furthermore this wattless magnetizing current is large in amount so as to provide the necessary ampere turns with the comparatively small number of turns of the main winding. The result is that the resultant current, particularly on light loads of the motor, is composed largely of wattless current and therefore the power factor is low.

It is the main object of the present invention to so regulate the relation of the current and electro-motive force in a dynamo electric machine that it may be such as is most efficient or desired.

In the case of the induction motor as above referred to, the wattless current in the main winding is reduced or even wiped out by supplying the magnetizing current by means of an auxiliary winding. This auxiliary winding may be of a larger number of turns than the main winding so that the desired number of ampere turns may be secured with a smaller current; also since the magnetizing current is substantially in quadrature with the impressed electro-motive force on the main winding, the auxiliary winding may be excited by means of a current of proper phase relation which may be obtained from any suitable source and may be modified by the inductance or capacity of its circuit to effect this result. In polyphase apparatus the auxiliary winding supplying the magnetizing current for the main winding of one phase, may receive its exciting current from another phase whose electro-motive force approaches more nearly to the phase of the magnetizing current required for the main winding. Thus in the case of a two phase machine the magnetizing winding of one phase may be excited from the other phase, and since these two phases are in quadrature with each other, the exciting current supplied by one phase will, without shifting its phase at all, be in proper relationship to the excited phase to supply its magnetizing current.

In the case of a three phase winding, the magnetizing or auxiliary winding of one phase may be energized from one of the other phases so that the electro-motive force impressed by the exciting phase upon the auxiliary winding will be only sixty degrees from the excited phase. The exciting current can then be shifted to accord with that needed for the excited phase by suitably adjusting the inductance or capacity, or both, of its circuit.

While the invention has by way of illustration been referred to particularly in connection with induction motors, and its utility pointed out as a means for bringing voltage and current into phase whereby the power factor is increased, it is useful in connection with other apparatus and for other purposes.

Other and ancillary objects of the invention will appear hereinafter.

In the accompanying drawings which illustrate the invention—

Fig. 1 is an end view partly broken away, of an induction motor;

Fig. 2 is a diagram of the stator windings of a three phase induction motor;

Fig. 3 is a vector diagram showing phase relationships in regard to the arrangement of Fig. 2; and Fig. 4 is a diagram of the stator windings of a two phase induction motor.

Referring to the drawings, the induction motor comprises the stationary member 1 having the distributed three-phase main winding 2 disposed in slots. The construction of such a stator is well understood in the art and need not be described in further detail here.

The rotor 3 having the shaft 4 may be of any usual or suitable construction having the winding 5 which may be of the squirrel-cage or other suitable type.

The structure as thus far referred to may be that well understood in the art except that the slots containing the winding 2 may be made somewhat larger than usual so that they may receive an auxiliary winding now to be referred to.

The auxiliary winding 6 is a laid in the slots with the main winding 2 and is a duplicate of it throughout except that the auxiliary winding has a greater number of turns, as will be again referred to, and the cross section of the auxiliary winding conductors may be less than that of the conductors of the main winding.

There is thus on the stator a main three phase distributed winding of usual form on which is superposed an auxiliary three phase winding of the same form.

The connections of the stator windings are shown in Fig. 2 wherein the main winding 2 comprises the phase windings 7, 8 and 9 connected in Y and having their free ends respectively connected with the three phase supply mains 10, 11 and 12 by the conductors 13, 14 and 15. Superposed on the phases 7, 8 and 9 of the main winding are the phases 16, 17 and 18 respectively of the auxiliary winding 6. Each of the phase windings 16, 17 and 18 has connected in series with it a variable condenser and a resistance whereby the amount of current and its phase displacement with relation to the impressed electro-motive force may be regulated. Thus the phase winding 16 has the condenser 19 and resistance 20 in series with it, the phase winding 17 has the condenser 21 and resistance 22 in series with it and the phase winding 18 has the condenser 23 and resistance 24 in series with it.

It will be seen that the auxiliary phase winding 16 superposed on the main phase winding 7, is connected (in series with its variable condenser and resistance) across the impressed electro-motive force of the main phase winding 8 which is 120° in advance of that of the winding 7. The auxiliary winding 16 therefore would have impressed upon it an electro-motive force which is 120° in advance of that impressed upon the corresponding main phase winding 7 except that the connections of the auxiliary winding 16 are reversed with relation to the connections of the main phase winding 8 so that the electro-motive force impressed upon the auxiliary phase winding 16 is shifted 180° from that of the main phase winding 8 and so will be thrown into a position where it is 60° behind the main phase winding 7; but the phase of magnetic flux lags approximately 90° behind the impressed electro-motive force, so that the electromotive force impressed upon the auxiliary winding is 30° in advance of the phase of the flux needed for winding 7.

As has been before referred to, each of the auxiliary windings is made up of a large number of turns so that the inductance of the phase winding 16 causes the current in that winding to lag behind the impressed electro-motive force by an angle greater than 30°, the current in the auxiliary winding being thus made to lag behind the phase of the magnetizing current by a small angle. Under such conditions a certain amount of capacity inserted in the circuit of the auxiliary winding by a suitable adjustment of its condenser will neutralize all or part of the inductance so that the current of the auxiliary winding may be brought into the phase for magnetizing current i. e. 90° behind the impressed electro-motive force on the main winding 7, and by suitable adjustment of the condenser and the resistance in the circuit of the auxiliary winding, the magnetizing current which will flow in the winding 16 may be made of the desired amount and in the desired phase relationship. This amount may be such that the magnetizing current in the winding 16 will furnish more magnetic flux than is needed for the winding 17 so that winding 7 will furnish a leading current to neutralize the excess flux and so draw from the line a leading current and so produce a leading power factor in the line to counteract the effect of a lagging power factor produced by other apparatus, thus giving to generators a power factor of unity.

In the same manner that the auxiliary winding 16 is excited by being connected across the main phase winding 8, the auxiliary phase windings 17 and 18 are excited by being connected across the main phase windings 9 and 7 respectively.

The matter may perhaps be more clearly understood by reference to the vector diagram of Fig. 3 wherein O—A, O—B and O—C respectively represent the electro-motive forces impressed by the source of supply upon the three phases of the main winding. The electro-motive forces impressed upon the auxiliary windings are respectively represented by the lines O—a′, O—b′ and O—c′. The line O—a′ represents the electro-motive force impressed upon the auxiliary winding which is superposed on the main winding having the impressed electro-motive force O—A and its electro-motive force O—a′ is equal to the electro-motive force O—C reversed. Similarly the electro-motive force O—b′ is equal to the electro-motive force O—A reversed and represents the electro-motive force impressed upon the auxiliary winding corresponding to the main winding which has impressed upon it the electro-motive force O—B and similarly the line O—c′ is an electro-motive force equal to the electro-motive force O—B reversed, and represents the electro-motive force impressed upon the auxiliary winding corresponding to that main winding upon which is impressed the electro-motive force represented by the line O—C.

As has been referred to, the auxiliary phase windings are made of high inductance so that the current in the winding O—a' will be retarded in phase into a position which may be represented by the line O—a'' similarly the current in the phase winding corresponding to the line O—b' will be shifted into a position indicated by the line O—b'' and the current in the phase corresponding to the line O—c' will be retarded in phase to a position indicated by the line O—c''. By regulating the capacity in series with the auxiliary windings the currents in them may be advanced in phase into coincidence with the 90° position from the impressed electro-motive force of the main phase windings. In fact any desired phase relationship may be obtained to suit any existing conditions to be met and by the variable resistance and capacity in circuit with the auxiliary windings of the respective phase, the current may be adjusted to the desired amount and phase relationship.

By reason of the fact that the auxiliary windings contain a large number of turns, a small amount of current will suffice to provide the necessary excitation.

From the above it will be seen that the magnetic flux for the various phases may be efficiently supplied by the auxiliary windings while the current in the main windings varies to meet the load demands and regulation may be so effected as to secure a power factor of unity or other desired value.

Referring to Fig. 4 of the drawings, the arrangement of windings for a two phase induction motor is illustrated. In this case as in that of the three phase motor, the construction may be that well known or suitable for motors of the type, the auxiliary magnetizing winding being added thereto, the auxiliary winding in the case of the two phase motor being a duplicate of the main two phase distributed winding of the motor stator, except that it is of a greater number of turns and its conductors are of smaller section, and laid in the slots with the main winding so as to follow the same throughout that is, is superposed thereon.

In the diagram of Fig. 4, the main stator windings 19' and 20' are respectively connected across the two phase supply mains, 21', 22', 23' and 24', the phases being in quadrature as is customary in two phase systems. The auxiliary phase winding 25 superposed on the main phase winding 19', is connected across the phase of the winding 20' which phase lags 90° behind that of the winding 19' so that the voltage impressed on the auxiliary winding 25 lags 90° behind the impressed electro-motive force of the corresponding main phase winding 19'. The auxiliary winding however has inductance so that its current will have an angle of lag behind this position but this can be compensated for to any desired extent by means of the adjustable condenser 26 in series with it. By means of this condenser and the variable ohmic resistance 27, also in series in circuit with the auxiliary winding, the current can be adjusted as desired in both amount and phase relation.

In a similar way the auxiliary phase winding 28 superposed on the main phase winding 20', is connected (in series with the variable ohmic resistance 29 and adjustable condenser 30) across the terminals of the main phase winding 19' and reversed so that the electro-motive force impressed on the auxiliary winding 28 will be 90° displaced from that impressed on the main phase windings; care should be taken however to have the supply connections connected to cause current to flow in the proper direction through the auxiliary winding for if connected in one relation the electro-motive force impressed upon the auxiliary winding will be 90° in advance of that impressed on the main winding of the same phase, while if the terminals are reversed the impressed electro-motive force of the auxiliary winding will lag 90° behind that impressed on the corresponding main winding. The latter is the condition desired since it brings the phase of the electro-motive force impressed on the auxiliary winding close to if not exactly in phase with the flux (90° behind the main winding).

While the invention has been illustrated in what are considered its best applications it may have other embodiments without departing from its spirit and is not therefore limited to the structure shown in the drawings.

What I claim is:

1. The combination with a source of supply of alternating current of a plurality of different phases, of a dynamo electric machine having relatively movable members, a main alternating current winding on one of said members, means for energizing said winding with alternate current, an auxiliary winding adapted to supply magnetism to the magnetic circuit of the aforesaid winding and means for energizing corresponding main and auxiliary windings by different ones of said phases respectively.

2. The combination with a source of supply of alternating current of a plurality of different phases, of a dynamo electric machine having in combination relatively movable members, a main alternating current winding, a second alternating current winding superposed on the aforesaid winding and means for energizing said windings by alternating currents from different ones of said phases respectively.

3. The combination with a source of supply of alternating current of a plurality of different phases, of a dynamo electric machine, having in combination relatively movable members, a main alternating current winding, a second alternating current winding superposed on the aforesaid winding and means for energizing said winding by alternating current from different ones of said phases respectively, said second winding having a greater number of turns than the other said winding.

4. The combination with a polyphase source of electric supply, of a dynamo electric machine having relatively movable members, a polyphase winding on one of said members, an auxiliary polyphase winding having phase windings corresponding to those of the aforesaid winding, means for energizing the first mentioned winding by polyphase current and means for energizing said auxiliary winding by polyphase current, the corresponding phases of the said windings being energized from different phases of said source respectively.

5. The combination with a polyphase source of electric supply, of a dynamo electric machine having relatively movable members, a polyphase winding on one of said members, an auxiliary polyphase winding having phase winding corresponding to those of the aforesaid winding, means for energizing the first mentioned winding by polyphase current and means for energizing said auxiliary winding by polyphase current, the corresponding phases of the said windings being energized from different phases of said source and said auxiliary winding having a greater number of turns than the other of said windings.

6. A dynamo electric machine having in combination relatively movable members, a polyphase winding in one of said members, means for energizing said winding with polyphase currents, an auxiliary polyphase winding having phases corresponding to those of the aforesaid polyphase winding and means for impressing upon the phases of said auxiliary winding respectively electro-motive forces of phases differing from those of the corresponding phases of the main winding respectively and in phase with other phases of said main winding respectively.

7. The combination with polyphase supply mains, of a dynamo electric machine comprising relatively movable members, a polyphase winding on one of said members, means for connecting said polyphase winding with said polyphase mains, an auxiliary polyphase winding superposed on the aforesaid polyphase winding and means for connecting said auxiliary winding with said supply mains, superposed phases of said polyphase windings being connected across different phases of said supply mains.

8. The combination with a source of supply of alternating current of a plurality of different phases of a dynamo electric machine having relatively movable members, a main alternating current winding, and a second alternating current winding superposed thereon, of means for energizing said windings by alternating current from different ones of said phases and means for adjusting the phase of current in said auxiliary winding.

9. The combination with a source of supply of alternating current of a plurality of different phases of a dynamo electric machine having relatively movable members, a main alternating current winding, and a second alternating current winding superposed thereon, of means for energizing said windings by alternating current from different ones of said phases and a condenser in the circuit of said auxiliary winding.

10. The combination with a source of supply of alternating current of a plurality of different phases of a dynamo electric machine having relatively movable members, a main alternating current winding, a second alternating current winding superposed thereon, of means for energizing said windings by alternating current from different ones of said phases and an adjustable condenser and ohmic resistance in the circuit of said auxiliary winding.

11. The combination with a source of polyphase alternating current of an induction motor having relatively movable members, an alternating current main inducing winding on one of said members, an induced winding on the other of said members and an auxiliary alternating current winding adapted to supply the magnetizing current for said motor, of means for supplying said inducing and auxiliary windings with currents from said source but with corresponding portions of said inducing and auxiliary windings being supplied with current from different phases of said source.

In testimony whereof I have signed this specification this 7th day of April, 1920.

THOMAS W. VARLEY.